(12) United States Patent
Chen et al.

(10) Patent No.: US 10,269,142 B2
(45) Date of Patent: Apr. 23, 2019

(54) PROVIDING PREDICTABLE AND CUSTOMIZABLE ELECTRONIC COLOR MIXING

(71) Applicant: Adobe Inc., San Jose, CA (US)

(72) Inventors: Zhili Chen, San Jose, CA (US); Daichi Ito, Los Gatos, CA (US); Byungmoon Kim, Sunnyvale, CA (US); Gahye Park, Seoul (KR)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/336,085

(22) Filed: Oct. 27, 2016

(65) Prior Publication Data

US 2018/0122103 A1 May 3, 2018

(51) Int. Cl.
*G09G 5/02* (2006.01)
*G09G 5/06* (2006.01)
*G06T 11/00* (2006.01)

(52) U.S. Cl.
CPC ........... *G06T 11/001* (2013.01); *G09G 5/026* (2013.01); *G09G 5/06* (2013.01); *G09G 2354/00* (2013.01)

(58) Field of Classification Search
None
See application file for complete search history.

(56) References Cited

U.S. PATENT DOCUMENTS

| 6,271,826 B1* | 8/2001 | Pol ........................... G09G 5/06 345/589 |
| 2007/0086027 A1* | 4/2007 | Tin ........................... G09G 5/02 358/1.9 |
| 2008/0055666 A1* | 3/2008 | Gila ..................... H04N 1/6033 358/448 |
| 2011/0205239 A1* | 8/2011 | Lee ........................... G09G 5/02 345/589 |
| 2014/0098387 A1* | 4/2014 | Chang .................. H04N 1/6058 358/1.9 |

* cited by examiner

*Primary Examiner* — Kee M Tung
*Assistant Examiner* — Yanna Wu
(74) *Attorney, Agent, or Firm* — Keller Jolley Preece

(57) ABSTRACT

The present disclosure is directed towards methods and systems for providing a digital mixed output color of two reference colors defined in an RGB model where the digital mixed output color at least generally reflects a color produced by mixing physical pigments of the two reference colors or a custom user-defined color. The systems and methods receive a selection of two reference colors to mix. Additionally, the systems and methods can determine a mixing ratio of the two reference colors. Moreover, the systems and methods query at least one predefined mixing table and identify from the at least one predefined mixing table a mixed output color correlating to a mixture of the two reference colors.

20 Claims, 8 Drawing Sheets

PROVIDING PREDICTABLE AND CUSTOMIZABLE ELECTRONIC COLOR MIXING

BACKGROUND

Digital images and designs conventionally use an RGB (i.e., red/green/blue) color model. More particularly, digital images conventionally use an additive color model in which red, green, and blue light are added together at various levels to reproduce an array of colors. In creating and/or manipulating digital images, color mixing (e.g., mixing two or more colors) is important. One problem with conventional color mixing systems that mix colors defined within an RGB color model (hereinafter "RGB colors") is that resulting output colors (i.e., colors that result from combining RGB values of selected colors) differ from colors resulting from mixing actual pigments of color. For example, mixing a yellow RGB color with a blue RGB color results in gray instead of green. Such results lead to disadvantages and problems with mixing colors for digital image purposes (e.g., creating artwork, designs, editing digital photographs). For example, by not providing expected and easily predictable mixed output colors, a user cannot readily and easily mix colors with a predictable and desired result when using many conventional color mixing systems. Furthermore, the user may waste significant time testing and mixing different colors before achieving (e.g., generating) a desired color. As a result, a user may become frustrated when using such conventional mixing models and may avoid using digital image creation and manipulation systems that do not provide predictable color mixing.

Some more physically correct models exist such as the Kubelka-Munk model (hereinafter "KM model"). The KM model computes reflectance of the colors by combining absorption and scattering coefficients of pigments at different wavelengths. The KM model represents each color by concentrations of several pre-defined pigments (e.g., conventionally more than eight). Accordingly, the KM model often requires more than three channels (e.g., more than a blue, a green, and a red channel) to store the color. Furthermore, mixing calculations using the KM model involves complex formula evaluation, and the images (i.e., the colors of the images) need to be converted to an RGB model before rendering the mixed color. As a result, mixing with the KM model requires a considerable amount of processing power and memory (e.g., computation overhead). For devices with limited memory space and slower processing power, such a color model becomes cumbersome and, in some instances, unusable. Another problem with the KM model is that any conversion from the KM model to the RGB model is irreversible. The irreversibility of the conversion within the KM model may lead to users losing progress (e.g., work) made on digital images if, for example, the digital image is converted on accident or prior to the user completing the work.

Another conventional more physically correct model is the red-yellow-blue model (hereinafter, "RYB model"), which uses a predefined mixing output of primary colors (i.e., red, yellow, and blue) and interpolates between them to achieve output mixed colors. However, the RYB gamut (e.g., range and/or scope) is significantly smaller than the RGB color space. Thus, significantly fewer colors are available within the RYB gamut in comparison to the RGB color space. Furthermore, the RYB uses a nonlinear conversion method that prevents generating (e.g., creating) pure white and/or pure black colors. As a result, a user's color palette (e.g., range of colors) is significantly limited in comparison to using real pigment paints or RGB colors. Such limitations provide significant disadvantages to users (e.g., artists, photographers, animators, etc.) using the RYB model to mix colors for use within their digital images. Moreover, similar to the KM model, converting colors from the RYB model to the RGB model is irreversible.

Accordingly, these and other disadvantages exist with respect to conventional systems and methods for digitally mixing colors.

SUMMARY

Embodiments of the present disclosure provide benefits and/or solve one or more of the foregoing or other problems in the art with systems and methods for providing accurate color mixing using an RGB color model. For example, the systems and methods disclosed herein generate and/or provide mixed output colors (e.g., colors resulting from mixing two or more reference colors (e.g., input colors) defined within the RGB model) that at least generally reflect (e.g., match) output colors that would result from mixing the two or more reference colors in the real world. More particularly, in one or more embodiments, the systems and methods utilize predefined mixing tables to efficiently determine a resulting mixed color from two or more selected colors (e.g., colors selected to be mixed). Specifically, the mixing tables provide predetermined RGB values for resulting mixed output colors from mixing two more reference colors defined within the RGB color model. Furthermore, the resulting colors defined by the provided predetermined RGB values accurately reflect real world colors that result (e.g., would result) from mixing the same selected reference colors in the real world.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1:
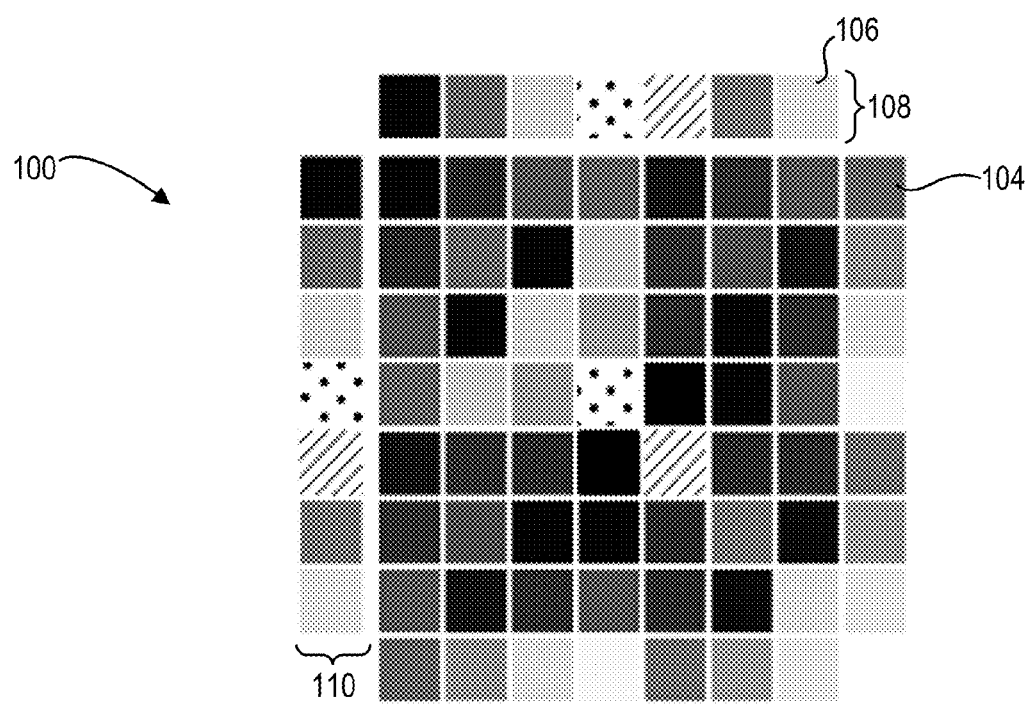
FIG. 1 illustrates a schematic diagram of a mixing table of a color mixing system according to one or more embodiments of the present disclosure.

One or more embodiments of the present disclosure include a color mixing system for providing accurate digital color mixing for reference colors (e.g., input colors) defined within an RGB color model. In one or more embodiments, the color mixing system utilizes at least one predefined mixing table to identify (e.g., determine) mixed output colors (e.g., colors resulting from mixing two or more colors) for reference colors defined within the RGB color model. In additional embodiments, the color mixing system utilizes a customizable mixing table that a user can customize to generate customized output colors.

In one or more embodiments, the color mixing system utilizes the predefined mixing tables to determine mixed output colors for two given reference colors. In particular, the mixed output colors, which are provided by the mixing table, at least generally reflect real world mixed output colors that would result from mixing the reference colors (e.g., oil paints having the same reference colors).

By providing mixed output colors that at least generally reflect real world mixed output colors, the color mixing system provides a more predictable and accurate color mixing system in comparison to conventional color mixing systems. In particular, the color mixing system of the present disclosure operates (e.g., functions and/or behaves) more similar to a physical color palette than conventional color mixing systems. By providing a more predictable and accurate color mixing system, the color mixing system of the present disclosure may be more appealing to potential users (e.g., photographers, artists, animators).

In some embodiments, the color mixing system utilizes the predefined color mixing tables to determine the mixed output colors for the two reference colors without converting any of the two reference colors or the mixed output colors to another color model (e.g., the KM model and/or RYB model). Thus, in one or more embodiments, the color mixing system determines mixed output colors while keeping any input data and/or output data (e.g., data related to the reference colors and/or output colors) defined within the RGB color model.

By determining mixed output colors without converting reference colors or output colors, the presently disclosed color mixing system, in contrast to conventional systems, advantageously reduces computations to determine mixed output colors. With reduced computations, the color mixing system helps reduce the amount of required processing power and memory space (e.g., computation overhead), which are typically needed in conventional systems for determining mixed output colors. Additionally, by determining mixed output colors without converting colors to different color models, the color mixing system of the present disclosure determines the mixed output colors faster than conventional color mixing systems, thereby improving performance of a client device (e.g., a computing device) utilizing the color mixing system. Furthermore, by removing any need to convert colors to other color models, the color mixing system of the present disclosure removes any problems associated with irreversible conversions, which are common in conventional color mixing systems.

As mentioned briefly above, the colors mixing system includes a customizable mixing table that can be customized by a user to provide customized output colors according to the user's preferences. A user can select which mixed output colors will be produced (e.g., provided) by mixing two or more particular reference colors. That is, the user can customize the mixing table such that the mixing table will provide mixed output colors that do not reflect real world mixed color. For example, the user may want the mixing table to provide non-real world mixed colors for artistic purposes.

By including a customizable mixing table, the color mixing system of the present disclosure advantageously provides a unique experience for each individual user, over existing conventional systems. In particular, by providing a customizable mixing table, the color mixing system allows a user (e.g., an artist, photographer, animator) to develop their own unique palette of mixed output colors (e.g., range of colors that can be utilized by the user when manipulating images), which is more akin to real world color palettes. For example, if a user does not agree with a mixed output color (e.g., the user thinks that a different shade of a color should be output), the user can adjust (e.g., customize) the mixed output color such that the mixed output color matches the user's preference. Furthermore, by providing a customizable mixing table, the color mixing system provides a "shortcut" to a particular mixed output color. The color mixing system can provide a customized output color that would typically require mixing more than two reference colors (e.g., multiple mixings) by receiving a selection of just two reference colors. In view of the foregoing, the color mixing system of the present disclosure may be more appealable to users (e.g., artists, photographers, animators) than conventional color mixing systems by providing the users with more flexibility in their color mixing.

Among other benefits, the color mixing system improves a performance of the computer system utilizing the color mixing system. In particular, because the color mixing system requires less processing power and memory space (e.g., computation overhead), the color mixing system can lead to faster processing of providing mixed output colors, which leads to better performance of an image manipulation system utilizing the color mixing system. As a result, the color mixing system can be utilized on computer systems (e.g., client devices) with limited memory space and slower processing power (e.g., mobile devices, tablets, laptops, etc.). Furthermore, because the color mixing system requires less computation overhead in comparison to conventional color mixing systems, the color mixing system of the present disclosure provides a more consistent (e.g., stable) and uniform experience to a user using a computer system to utilize the color mixing system.

FIG. 1 illustrates a schematic diagram of a mixing table 100 of a color mixing system according to an embodiment of the present disclosure. The color mixing system utilizes the mixing table 100 to identify a mixed output color 104 (e.g., a mixed color) of two reference colors 106 (e.g., input colors or two colors to be mixed). Specifically, the color mixing system utilizes the mixing table 100 to identify a mixed output color 106 of two primary reference colors. As used herein, the terms "primary color," "primary reference color," or any derivative terms refer to one of eight primary colors of the RGB color space. In particular, the terms "primary color," refer to one of black, red, green, yellow, blue, magenta, cyan, and white.

In some embodiments, the mixing table 100 includes (e.g., defines) a plurality of mixed output colors 104. Each mixed output color 104 correlates to a mixture of two primary reference colors 106. In particular, for each primary reference color 106, the mixing table 100 includes a plurality of predefined mixed output colors 104 representing the mixtures of the primary reference color 106 with each of the eight primary colors of the RGB space. For example, for the primary reference color 106 cyan, the mixing table 100 includes a plurality of predefined mixed output colors 104 representing the mixtures of cyan and black, cyan and red, cyan and green, cyan and yellow, cyan and blue, cyan and magenta, cyan and cyan, and cyan and white. Furthermore, the mixed output colors 104 may at least generally correlate to a mixture of the two primary reference colors 106 with physical pigments. The plurality of mixed output colors 104 of the mixing table 100 at least generally reflect real world mixed output colors resulting from mixing the two primary reference colors 106 using oil paints or other physical pigments.

As illustrated in FIG. 1, in some embodiments, the mixing table 100 comprises an 8 by 8 table (e.g., a table having 8 rows and 8 columns) of predefined mixed output colors 104. In one or more embodiments, the mixing table 100 further includes a guide row 108 and a guide column 110. Each of the guide row 108 and the guide column 110 include the eight primary colors of the RGB color space. Furthermore, in some embodiments, for each potential combination of two of the eight primary reference colors 106, the color mixing system utilizes the guide column 110 and the guide row 108 to identify a mixed output color 104 correlating the mixture of the two primary reference colors 106. For example, referring now to FIGS. 1 and 2, the color mixing system identifies a first reference color 106a of the two primary reference colors 106 within the guide row 108 and a second reference color 106b of the two primary reference colors 106 within the guide column 110. Furthermore, based the positions of the first reference color 106a and the second reference color 106b within the guide row 108 and the guide column 110, respectively, the color mixing system identifies the mixed output color 104 correlating to a mixture of the first reference color 106a and the second reference color 106b. In other embodiments, the mixing table 100 may not include the guide row 108 and the guide column 110. Rather, each mixed output color 104 can include an identifier indicating the two reference colors 106 (e.g., the first reference color 106a and the second reference color 106b) mixed to achieve the mixed output color 104, and the mixing table 100 can identify the mixed output color 104 based on the identifier.

Furthermore, in one or more embodiments, the mixing table 100 is weighted according to reflect different amounts of the colors being mixed. The mixing table 100 may be predefined based on weights of the primary reference colors 106. Still further, the mixing table 100 may be predefined with a certain mixing ratio of the two reference colors 106 (e.g., an amount (i.e., weight) of a first reference color 106a vs. an amount (i.e., weight) of a second reference color 106b). As used herein, the term "weight" and any derivative terms refer to an amount of the each of the primary reference colors 106 relative to each other within the mixture of the two primary reference colors 106. For example, a first reference color 106a can have a weight of 0.75 (e.g., the first reference color 106a makes up 75% of the mixture of the two reference colors 106) and a second reference color 106b can have a weight of 0.25 (e.g., the second reference color 106b makes up 25% of the mixture of the two reference colors 106).

The color mixing system can include mixing tables weighted for any number of combinations of the first reference color 106a and second reference color 106b. For example, a particular mixing table 100 can be weighted for any combination of the two reference colors 106 where the weights of the two reference colors 106 combine to equal 1.0. As a non-limiting example, a given mixing table 100 can be weighted as 0.90/0.10, 0.75/0.25, 0.67/0.33, or 0.50/0.50. Although specific percentages are discussed, the color mixing system can include mixing tables predefined with any percentages (e.g., weights).

In operation, the color mixing system receives and/or detects a selection of reference colors 106 to be mixed. For example, the color mixing system receives and/or detects a selection of a first reference color 106a and a second reference color 106b. As used herein, the term "selection" and any derivative terms in regard to reference colors 106 can refer to any detected indication of choosing a reference color 106. For example, in some embodiments, a selection of a reference color 106 can include a user interaction with a graphical user interface (hereinafter "GUI") of the image manipulation system (referred to hereinafter as "image manipulation GUI"). In one or more embodiments, a selection of two reference colors 106 includes detecting a user interaction selecting (e.g., indicating) a first reference color 106a and a separate user interaction selecting a second reference color 106b. For example, a selection of the two reference colors 106 may include detecting user interaction with a dropdown box of the image manipulation GUI. As another non-limiting example, the image manipulation GUI can include a mixing table 100 GUI with which a user can select (e.g., click) a first reference color 106a from the guide row 108 and a second reference color 106b from the guide column 110.

In additional embodiments, a selection of two reference colors 106 includes merely overlapping a first reference color 106a with a second different reference color 106 within the image manipulation GUI. For example, a first digital marking (e.g., stroke, line, image, pixel) having a first reference color 106a may be present and/or created within the image manipulation GUI of the image manipulation system, and the selection can include the color mixing system detecting a user interaction disposing a second digital marking having a second reference color 106b over at least a portion of the first digital marking having the first reference color 106a (e.g., adding a marking including the second reference color 106b overlapping at least a portion of the marking including the first reference color 106a).

In addition to indicating the reference colors 106 (e.g., the actual colors of the reference colors 106), a selection of the reference colors 106 can include indicating (e.g., choosing) weights for each of the reference colors 106 (e.g., a mixing ratio of the two reference colors 106). For example, in some embodiments, the color mixing system detects a user interaction with a dropdown box of the image manipulation GUI to indicate a weight for each of the two reference colors 106. In other embodiments, when the color mixing system detects a selection of the two reference colors 106, e.g., with the mixing table 100 GUI, the color mixing system can provide a weight selection GUI (e.g., a pop up window) to allow a user to indicate a weight for each of the two reference colors 106. Alternatively, the color mixing system provides a slider or other GUI control that allows a user to select a reference color and or weight of a reference color.

Additionally, in one or more embodiments, the color mixing system sets (e.g., automatically set) the weights (e.g., the mixing ratio) of the two reference colors 106 as 0.50 and 0.50 by default. For example, when selection of the two reference colors 106 includes overlapping a first reference color 106a with a second different reference color 106b within the image manipulation GUI of the image manipulation system, the color mixing system can set the weight of the first reference color 106a as 0.50 and the weight of the second reference color 106b as 0.50. Additionally, a user can set (e.g., choose or select) the default weights of the first reference color 106a and the second reference color 106b. As a non-limiting example, a user can set default weights within the image manipulation system via a dropdown box of the image manipulation GUI.

Upon receiving (e.g., detecting) a selection of two reference primary colors 106 and an indication of weights of the two reference primary colors 106, the color mixing system identifies a predefined mixing table 100 coinciding with (e.g., matching) the selected weights (e.g., the mixing ratio) of the two reference primary colors 106. For example, the color mixing system queries the mixing database of the color mixing system to identify a predefined mixing table 100 matching with the selected weights of the two reference primary colors 106. As will be discussed in further detail below, if the selected weights of the two reference primary colors 106 do not match any predefined mixing table 100, the color mixing system identifies two predefined mixing tables 100 that are closest to the mixing ratio of the two reference colors 106 and utilizes the two mixing tables 100 to interpolate and determine a mixed output color 104.

After identifying a predefined mixing table 100 matching the weights of the two reference primary colors 106, the color mixing system queries (e.g., utilizes) the predefined mixing table 100. The color missing system can perform a step for identifying, from the at least one predefined mixing table, a mixed output RGB color correlating to a mixture of the two reference RGB colors. For example, in some embodiments, the color mixing system utilizes the guide row 108 and guide column 110 to determine the mixed output color 104. In other embodiments, the color mixing system identifies the mixed output color 104 without utilizing any guide row 108 or the guide column 110 of the mixing table 100.

In some embodiments, the predefined mixing table 100 provides the RGB values of the mixed output color 104, and the color mixing system utilizes the RGB values to identify the mixed output color 104. The predefined mixing table 100 can provide a R (red), a G (green), and a B (blue) values (referred to hereinafter as "RGB values") between 0 and 255 to define the mixed output color 104. The color mixing system can superimpose red, green, and blue colors (e.g., light) based on the provided RGB values to produce the mixed output color 104. Moreover, the color mixing system can provide the mixed output color 104 to a graphics shader of the image manipulation system (e.g., can provide the colors as a constant). Furthermore, in some embodiments, the predefined mixing table 100 provides the RGB values in percentages (e.g., values between 0.0 and 1.0).

Upon determining the mixed output color 104 of the two reference primary colors 106, the color mixing system provides the mixed output color 104 to the image manipulation system (e.g., provides the mixed output color 104 such that the mixed output color 104 is usable within the image manipulation system). In some embodiments, the color mixing system provides the mixed output color 104 within a digital instrument (e.g., virtual pencil, virtual paintbrush, virtual marker, etc.) of the of the image manipulation GUI of the image manipulation system. For example, the color mixing system provides the mixed output color 104 within a digital painting instrument of the image manipulation GUI within the image manipulation system.

Although the mixing table 100 is described herein as including an 8 by 8 table of predefined mixed output colors 104, the disclosure is not so limited, and the mixing table 100 could include a table of any size. For example, additional reference colors 106 could be added to the mixing table 100 from the RGB space, and the mixing table 100 could define additional predefined mixed output colors 104. For example, the mixing table 100 could include a 10 by 10 table, a 12 by 12 table, a 16 by 16 table, etc.

Figure 2:
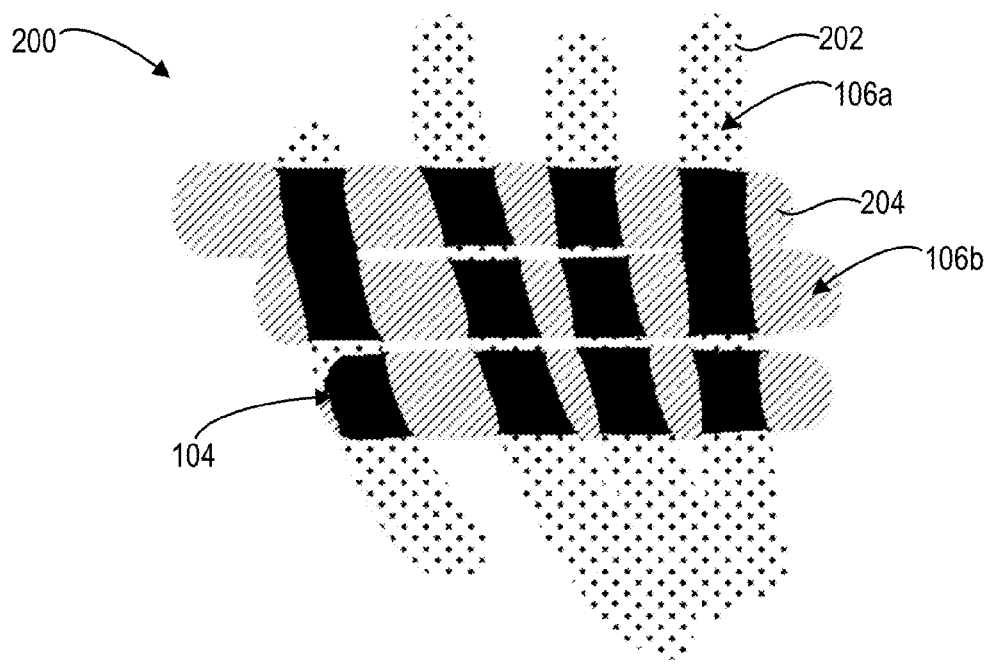
FIG. 2 illustrates a digital image created using the mixing tables of the color mixing system of FIG. 1 according to one or more embodiments of the present disclosure.

FIG. 2 illustrates an example digital image 200 created using the predefined mixing tables 100 of FIG. 1. In some embodiments, in response to user input, the image manipulation system creates the digital image 200 of FIG. 2 by causing a first graphical marking 202 having a first reference color 106a and a second graphical marking 204 having a second reference color 106b to at least partially overlap. For example, in response to user input, the image manipulation system, causes the first graphical marking 202 and the second marking 204 to overlap by at least one pixel within the image manipulation system GUI. Furthermore, the color mixing system, in response to the first reference color 106a and second reference color 106b overlapping, query the mixing database of the color mixing system to identify a predefined mixing table 100 matching the mixing ratio of the first reference color 106a and the second reference color 106b. Additionally, the color mixing system can query the identified predefined mixing table 100 to determine a mixed output color 104 that would result from mixing the first reference color 106a and the second reference color 106b.

Upon determining the mixed output color 104, the color mixing system replaces and/or overlaps any portions of the first graphical marking 202 and the second graphical marking 204 that are overlapping each other within the digital image 200 of the image manipulation GUI with the mixed output color 104. For example, the color mixing system disposes the mixed output color 104 where the two graphical markings 202, 204 overlap (e.g., mix). Furthermore, as noted previously, the mixed output color 104 can at least generally reflect a color that would result from mixing the first reference color 106a and the second reference color 106b with physical pigments (e.g., with oil paints).

In addition to mixing reference colors 106 in response to two reference colors overlapping in a digital image 200, the color mixing system also allows a user to select a new color with which to edit or place new elements on a digital canvas by selection of two reference colors 106. For example, in response to selection of a first color and a second color (and optionally weights for each color), the color mixing system can provide a mixed output color 104 with which the user can create markings (e.g., digital paint strokes). Thus, the color mixing system can simulate a user mixing colors on a palate and then applying the mixed output color on the canvas.

Figure 3:
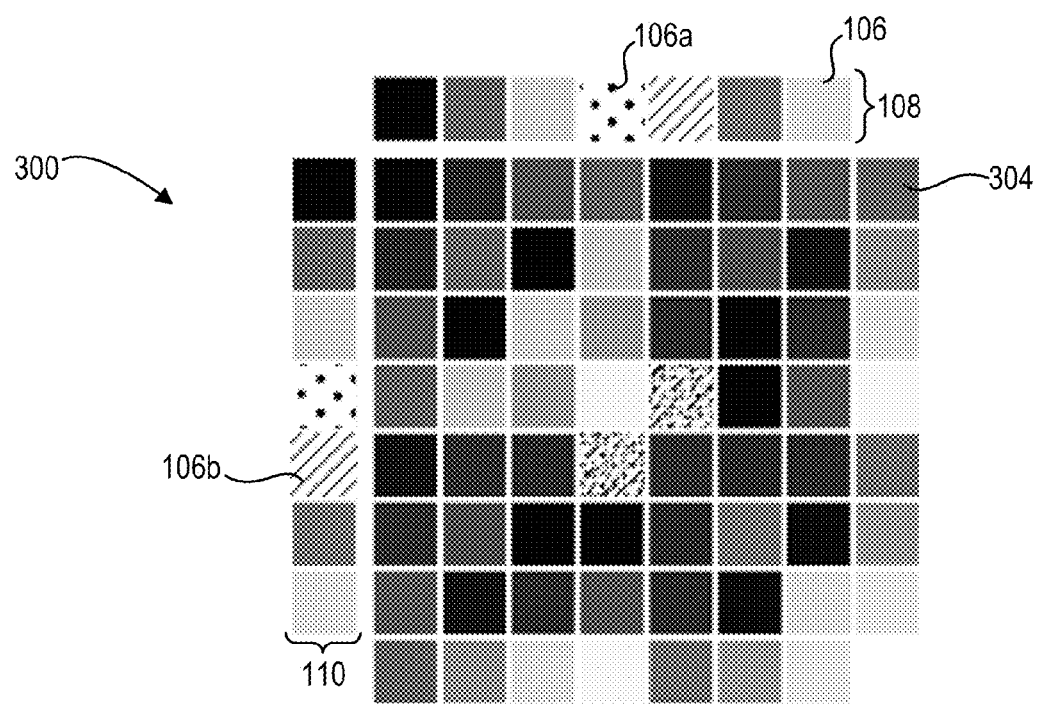
FIG. 3 illustrates a customizable mixing table of the color mixing system of FIG. 1 according to one or more embodiments of the present disclosure.

FIG. 3 illustrates a schematic diagram of an additional mixing table 300 of the color mixing system according to another embodiment of the present disclosure. Similar to the mixing table 100 of FIG. 1, the color mixing system utilizes the mixing table 300 of FIG. 3 to identify mixed output colors of two reference colors 106. However, the mixing table 300 of FIG. 3 is customizable. In particular, the color mixing system customizes the mixing table 300 to provide customized output colors 304 according to the user's preferences/input. For example, in response to user input, the color mixing system customizes the mixing table 300 such that the mixing table 300 will provide customized output colors 304 that may not reflect mixing of physical pigments.

For example, in some embodiments, the color mixing system provides a dropdown box that allows a user to specify a color for a particular cell of the mixing table 300 from a list of colors. For example, in response to a selection of a cell of the mixing table 300, the color mixing system causes a dropdown box to appear including a list of colors or a color wheel, color slider, or other color selection GUI control. Upon detecting a user interaction selecting a new customized output color 304 via a color selection GUI control, the color mixing system can store data representing the customized output color in the cell of the customized mixing table 300 within a mixing database.

Additionally, in one or more embodiments, the color mixing system, upon selection of a cell of the mixing table 300, provides the RGB values defining the color of the cell. For example, upon user selection of an output color from the mixing table, the color mixing system provides an input element (e.g., an input window) having the RGB values of the current color in the selected cell. The color mixing system can detect user interactions changing the RGB values and assign a new color to the cell based on the new RGB values.

In further embodiments, the color mixing system allows for customization of the mixing table 300 in response to user input rearranging the output colors of the mixing table 300. For example, in response to user input selecting and dragging mixed output colors to different locations within the mixing table GUI, the color mixing system changes the output colors for given combination of reference colors 106. Specifically, the color mixing system detects user interactions selecting (e.g., grabbing, clicking, indicating, etc.) and dragging an output color (e.g., a selectable element representing the mixed output color) of the mixing table GUI to a new location within the mixing table GUI. Upon detecting a user interaction rearranging output colors of the mixing table GUI, the color mixing system stores data representing the customized mixing table having the rearranged-customized output colors 304 within the mixing database.

In yet further embodiments, the color mixing system allows for customization of the color mixing table 300 via a sampling instrument. For example, in response to the user selecting a cell from the mixing table 300 and then selecting a color with the sampling instrument in a digital image or digital palate, the color mixing system places the selected color within the cell of the mixing table. Furthermore, the color mixing system stores data representing the customized mixing table 300 within the mixing database.

Figure 4:
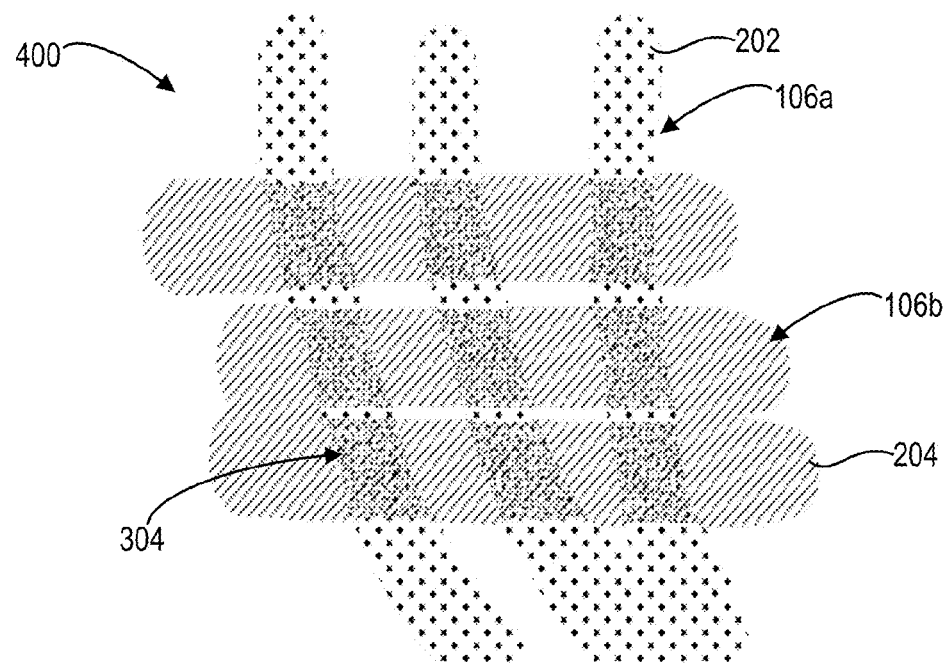
FIG. 4 illustrates a digital image created using the customizable mixing table of the color mixing system of FIG. 3 according to one or more embodiments of the present disclosure.

FIG. 4 illustrates an additional example digital image 400 created using the customized mixing table 300 of FIG. 3. Similar to the digital image of FIG. 2, in response to user input, the image manipulation system creates the digital image 400 of FIG. 4 by causing a first graphical marking 202 having a first reference color 106a and a second graphical marking 204 having a second reference color 106b to at least partially overlap. In response to detecting user interactions causing the first reference color 106a and second reference color 106b to overlap, the color mixing system queries the mixing database and the predefined-customized mixing table 300 to determine a customized output color 304.

Upon determining the customized output color 304, the color mixing system replaces and/or overlaps any overlapping portions of the first graphical marking 202 and the second graphical marking 204 with the customized output color 304. Furthermore, as noted above, the customized output color 304 may not reflect a color that would result from mixing the first reference color 106a and the second reference color 106b using physical pigments. Instead, the customized output color 304 reflects a user's set preferences. Thus, as shown by a comparison of FIGS. 2 and 4, despite using the same reference colors 106a, 106b, the color mixing system provides different output colors 104, 304 due to the differences in the mixing tables 100, 300.

The color mixing system also provides mixed output colors 104 for reference colors 106 that are not primary colors (e.g., colors that are one of the eight primary colors of the RGB space). For example, in many instances, two reference colors 106 selected by a user to be mixed by the color mixing system may not be one of the eight primary colors of the RGB space. Rather, the two reference colors 106 can be any two colors within the RGB space. Other reference colors (e.g., non-primary colors) within the RGB space that can be used in the color mixing system are described in further detail in reference to FIG. 5. In such instances, the color mixing system determines a mixed output color 104 by interpolating from the mixing table 100. The following paragraphs For example, upon receiving and/or detecting a selection of two reference colors 106 that are not one of the eight primary colors of the RGB space (referred to hereinafter as "non-primary reference colors 106"), the color mixing system determines whether a predefined mixing table 100 (e.g., the mixing table 100 from FIG. 1) of the mixing database matches the mixing ratio (e.g., the weights) of the two non-primary reference colors 106. If the color mixing system identifies a predefined mixing table 100 of the mixing database that matches the mixing ratio of the two non-primary reference colors 106, the color mixing system utilizes the identified predefined mixing table 100 to determine a mixed output color 104 of the two non-primary reference colors 106. If, on the other hand, the mixing color determines that none of predefined mixing tables 100 of the mixing database match the mixing ratio of the two non-primary reference colors 106, as will be discussed in further detail below, the color mixing system selects two of the predefined mixing tables 100 that are closest to the mixing ratio of the two non-primary reference colors 106 (or primary reference colors 106) and interpolates based on the predefined mixing tables 100 to determine the mixed output color 104.

If the color mixing system identifies a predefined mixing table 100 of the mixing database that matches the mixing ratio of the two non-primary reference colors 106, the color mixing system defines the two non-primary reference colors 106 in terms of weights of each of the eight primary colors of the RGB space. In particular, the color mixing system determines a weight of each of the eight primary colors within each of the two non-primary reference colors 106. For example, the color mixing system defines each of the two non-primary reference colors 106 as a 1 by 8 (i.e., one by eight or 1×8) matrix with each value within the matrix representing a weight of one of the eight primary colors of the respective non-primary reference color 106.

In addition to defining each of the two non-primary reference colors 106 in terms of the eight primary colors of the RGB space, the color mixing system defines the identified predefined mixing table 100 (e.g., the predefined mixing table 100 matching the mixing ratio of the first reference color 106a and the second reference color 106b) as three 8 by 8 (i.e., eight by eight or 8×8) matrices with each matrix correlating to a color channel of the RGB space. In particular, the color mixing system defines the predefined mixing table 100 as a first 8 by 8 matrix correlating to the red channel of the RGB space, a second 8 by 8 matrix correlating to the green channel of the RGB space, and a third 8 by 8 matrix correlating to the blue channel of the RGB space. Thus, in one or more embodiments, the color mixing system separates the RGB channels of the eight primary colors and the mixed output colors 104 of the predefined mixing table 100 into three 8 by 8 matrices.

Each value within the three 8 by 8 matrices represents a respective red, green, or blue value of the respective represented color (e.g., mixed output color 104). For example, the first 8 by 8 matrix correlating to the red channel of the RGB space includes the red values of each mixed output color 104 of the mixing table 100. The second and third 8 by 8 matrices likewise, include the green and blue values of the mixed output colors 104 of the mixing table 100.

After defining the two non-primary reference colors 106 in terms of weights of the eight primary colors and defining the predefined mixing table 100 as three 8 by 8 matrices, the color mixing system determines a red value, a green value, and a blue value (i.e., the RGB values) of the mixed output color 104. For example, based on the weights of the eight primary colors of each of the two non-primary reference colors 106 and the RGB values of the three 8 by 8 matrices, the color mixing system determines the RGB values of the mixed output color 104. Furthermore, based on the RGB values of the mixed output color 104, the color mixing system defines (e.g., produces) a mixed output color 104 according to the RGB model. Moreover, as discussed above, the mixed output color 104 can at least generally reflect an output color 104 that would result from mixing the two reference colors 106 with physical pigments.

In addition to determining a mixed output color 104, the color mixing system can prevent the mixed output color 104 from drifting (e.g., changing over time). In particular, given the same non-primary reference colors 106 repeatedly, and limitations of matrix multiplication, which is discussed in further detail below, a mixed output color 104 can change slightly over time. Accordingly, the color mixing system can prevent (e.g., at least substantially prevent) the mixed output color 104 from drifting. For example, the color mixing system can pad the weights (e.g., mixing ratio) of the reference colors 106 to prevent drifting.

As discussed briefly above, in some embodiments, the color mixing system may determine that none of the predefined tables match the mixing ratio (e.g., the weights) of the two reference colors 106 (either primary or non-primary). In such instances, the color mixing system identifies the two predefined mixing tables 100 that are the closest to the mixing ratio of the two reference colors 106. Based on the two closest predefined mixing tables 100, the color mixing system interpolates the RGB values of the mixed output color 104. Interpolating while using two predefined mixing tables 100 to determine the RGB values of the mixed output color 104 is discussed in greater detail below.

In addition to the foregoing description, operation of the color mixing system can also be described in relation to algorithms, equations, or pseudocode performed by a computing device (e.g., a client device). More particular, a step for identifying a mixed output RGB color correlating to a mixture of the two reference (e.g., input) RGB colors from at least one predefined mixing table can involve the following algorithms, equations, or acts described hereinafter.

In some embodiments, the color mixing system expresses, for two non-primary reference colors 106 having a mixing ratio (e.g., weights) exactly matching a predefined mixing table 100 of the mixing database, a mixed output color 104 as follows:

$$\text{sampleTable}(c_0, c_1, T_w)$$

where $c_0$ represents a first non-primary reference color 106 and $c_1$ represents a second non-primary reference color 106 and where $c_0$ and $c_1$ are defined as RGB values of the reference colors 106. Furthermore, $T_w$ represents an 8 by 8 matrix (e.g., the 8 by 8 matrix described above and correlating to the mixing table 100) having values indicating the RGB values of each mixed output color 104 of a mixing table 100. For convenience and as mentioned above, the color mixing system separates the RGB channels (e.g., the RGB values of each mixed output color 104) of the mixing table $T_w$ into three 8 by 8 matrices denoted by $R_w$, $G_w$, and $B_w$. For example, as discussed above, $R_w$ includes the red values of each mixed output color 104 of $T_w$. Furthermore, $G_w$ and $B_w$ include the green and blue values, respectively, of each mixed output color 104 of $T_w$.

Figure 5:
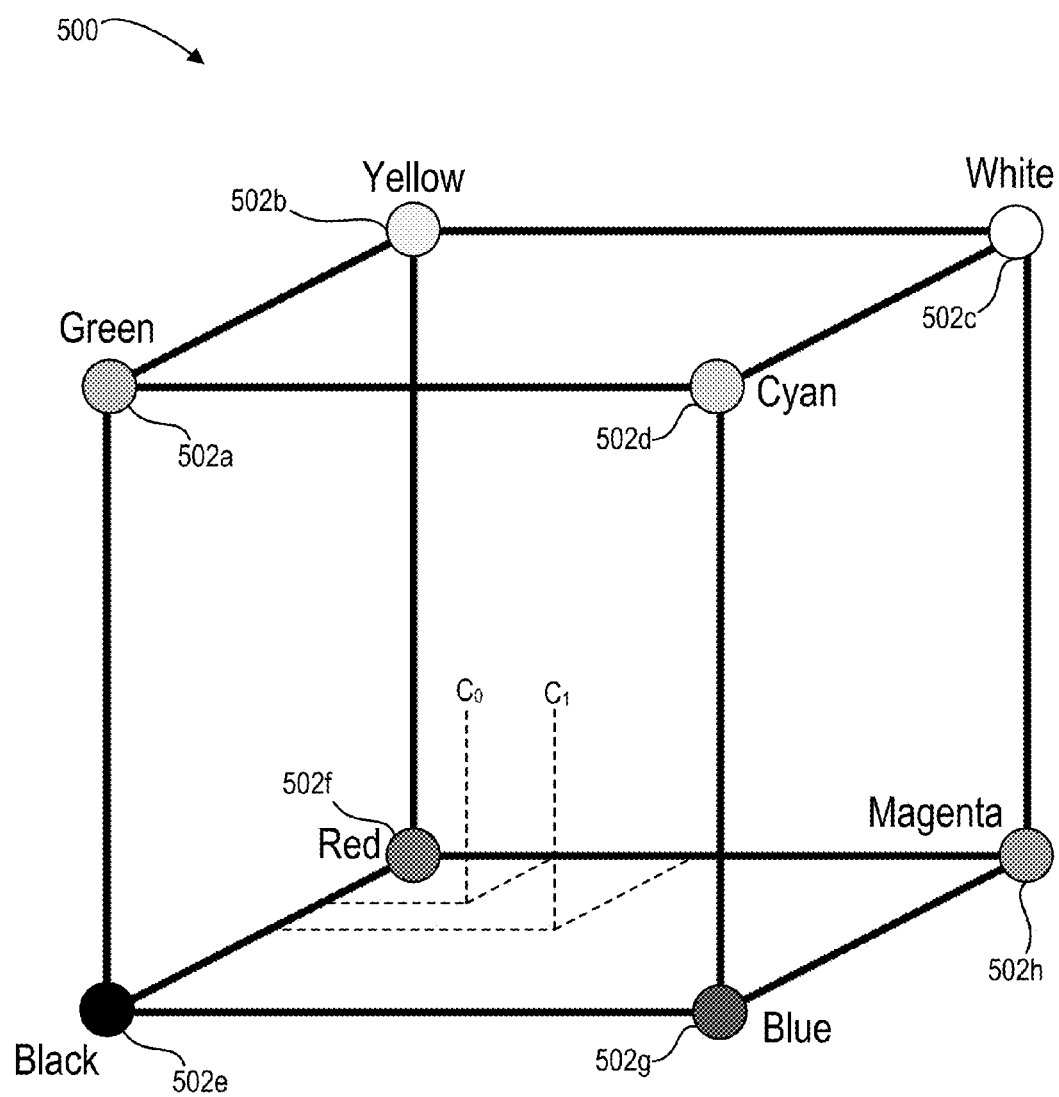
FIG. 5 illustrates a three-dimensional cube having the eight predefined primary colors of the RGB space defined as vertices of the three-dimensional cube.

Additionally, the color mixing system determines the trilinear interpolation weights of the eight primary colors of the RGB space for each of the first non-primary reference color 106 and the second non-primary reference color 106. As discussed above, the color mixing system defines each of the first non-primary reference color $c_0$ and the second non-primary reference color $c_1$ in terms of the eight primary colors of the RGB space. For example, FIG. 5 is a schematic view of a three-dimensional cube 500 of the RGB space. As illustrated, the eight predefined primary colors of the RGB space represent vertices 502a-h of the three-dimensional cube. Additionally, as shown in FIG. 5, the first non-primary reference color $c_0$ and the second non-primary reference color $c_1$ are defined in terms of the eight primary colors of the RGB space within the three-dimensional cube 500 of the RGB space. In particular, the color mixing system perform trilinear interpolation of the first non-primary reference color $c_0$ into a three-dimensional cube with the eight predefined primary colors of the RGB space as vertices of the three-dimensional cube. Specifically, if a non-primary reference color is defined as $c=(r, g, b)$, then the eight weights of the eight primary colors(or $w_c$) are:

$$w_{yellow}=rg(1-b)$$

$$w_{white}=rgb$$

$$w_{cyan}=(1-r)gb$$

$$w_{magenta}=r(1-g)b$$

$$w_{blue}=(1-r)(1-g)b$$

$$w_{black}=(1-r)(1-g)(1-b)$$

$$w_{red}=r(1-g)(1-b)$$

$$w_{green}=(1-r)g(1-b)$$

In the above equation, r, g, and b represent the RGB values of the non-primary reference color. For purposes of the above equation, r, g, and b are between 0.0 and 1.0 (e.g., a percentage which equals the raw RGB value of the color over 255). However, the above equation can be modified to utilize raw RGB values (e.g., between 0.0 and 255).

Furthermore, if the trilinear interpolation weights (e.g., the weights of the eight primary colors) for the two non-primary reference colors $c_0$, $c_1$ are $w_0$, $w_1$, respectively, the mixed output color 104 computed by the color mixing system will be:

$$\text{sampleTable}(c_0, c_1, T_w) = (w_0{}^T R_w w_1, w_0{}^T G_w w_1, w_0{}^T B_w w_1)$$

where $W^T$ is equal to the transpose of the matrix representing the trilinear interpolation weights of the respective reference color. The above-equation is referred to hereinafter as the "color mixing function." Via the color mixing function, the color mixing system determines the RGB values for the mixed output color 104. Furthermore, based on the RGB values of the mixed output color 104, the color mixing system defines the mixed output color 104 within the RGB space.

As mentioned briefly above, in implementation of the color mixing system, the floating point precision (e.g., round off error, which is known in the art) of the matrix multiplication and the inner product can cause the RGB values of the mixed output color 104 to drift slightly (e.g., change slightly) over time when repeatedly determining (e.g., mixing) the same mixed output color 104 for the same two non-primary reference colors 106. To alleviate (e.g., at least substantially alleviate) any drifting problem the color mixing system can modify the color mixing function (e.g., the function representing the mixed output color 104) as follows:

$$\text{sampleTable}(c_0, c_1, T_w) = (w_o{}^T R_w w_1, w_0{}^T G_w w_1, w_0{}^T B_w w_1)*(1-\alpha) + (c_0 + c_1)*\alpha/2$$

with $\alpha$ being defined as the following:

$$\alpha = (\text{clamp}(1.05 - 2*\|c_0 - c_1\|, 0, 1))^4$$

The above equation keeps each RGB values of the mixed output color 104 between a pair of respective boundary values. As a result, when the two reference colors $c_0$, $c_1$ are close, the color mixing function remains linear to reduce and/or prevent any drifting of the RGB values of the mixed output color 104.

As discussed briefly above, in several instances, the mixing ratio (e.g., individual weights) of the two non-primary reference colors 106 does not match a predefined mixing table 100. In such instances, the color mixing system utilizes an interpolation mixing function $\text{mix}(c_0, c_1, w)$ to determine the mixed output color 104 of the two non-primary reference colors 106. Furthermore, the interpolation mixing function $\text{mix}(c_0, c_1, w)$ defines the weights of the two non-primary reference colors $c_0$ and $c_1$ as being $w$ and $1-w$, respectively.

When utilizing the interpolation mixing function, the color mixing system identifies the two predefined mixing tables 100 that are closest (e.g., most proximate) to the mixing ratio of the two non-primary reference colors 106 $c_0$ and $c_1$. For example, the color mixing system identifies the closest two color mixing tables 100 based on where the weight $w$ is on a weight dimension (e.g., where the weight $w$ is between the boundaries 0.0 and 1.0). Furthermore, when the weight $w$ is close to 0.0 or 1.0, the color mixing system identifies only one closest mixing table 100, as will be discussed in further detail below.

For the following example equations, mixing tables $T_{0.5}$ (e.g., a color mixing table 100 having a mixing ratio of 50/50), $T_{0.25}$ (e.g., a color mixing table 100 having a mixing ratio of 25/75), and $T_{0.75}$ (e.g., a color mixing table 100 having a mixing ratio of 75/25) are predefined. Furthermore, when interpolating using the above predefined color mixing tables 100, the interpolating mixing function $\text{mix}(c_0, c_1, w)$ is defined as one of the following equations depending on the value of weight $w$:

$$\text{mix}(c_0, c_1, w) = \begin{cases} c_0 * \dfrac{0.25 - w}{0.25} + \text{sampleTable}(c_0, c_1, T_{0.25}) * \dfrac{w}{0.25} & (w < 0.25) \\[6pt] \text{sampleTable}(c_0, c_1, T_{0.25}) * \dfrac{0.5 - w}{0.25} + \text{sampleTable}(c_0, c_1, T_{0.5}) * \dfrac{w - 0.25}{0.25} & (0.25 \le w < 0.5) \\[6pt] \text{sampleTable}(c_0, c_1, T_{0.5}) * \dfrac{0.75 - w}{0.25} + \text{sampleTable}(c_0, c_1, T_{0.75}) * \dfrac{w - 0.5}{0.25} & (0.5 \le w < 0.75) \\[6pt] \text{sampleTable}(c_0, c_1, T_{0.75}) * \dfrac{1.0 - w}{0.25} + c_1 * \dfrac{w - 0.75}{0.25} & (0.75 \le w) \end{cases}$$

One of ordinary skill in the art will readily recognize that the above mixing tables ($T_{0.5}$, $T_{0.25}$, and $T_{0.75}$) can be replaced within other mixing tables 100 depending on the mixing ratio (e.g., weights) of the two non-primary reference colors 106. Furthermore, the color mixing system can add additional mixing tables 100 to the above equation to increase accuracy of the equation. For example, the color mixing system can utilize three of more mixing tables 100 in the above equation to increase accuracy of the equation. After interpolating with the above equation, the color mixing system can store a mixing table 100 representing the mixing ratio of the two non-primary reference colors 106 in the mixing database in order to increase processing speed of determining mixed output colors 104 having the same mixing ratio in the future.

Referring still to FIGS. 1 and 2, although some of the embodiments herein are described as having two non-primary reference colors 106, the color mixing system can mix a non-primary reference color 106 with a primary reference color 106 in the same manner described above.

Figure 6:
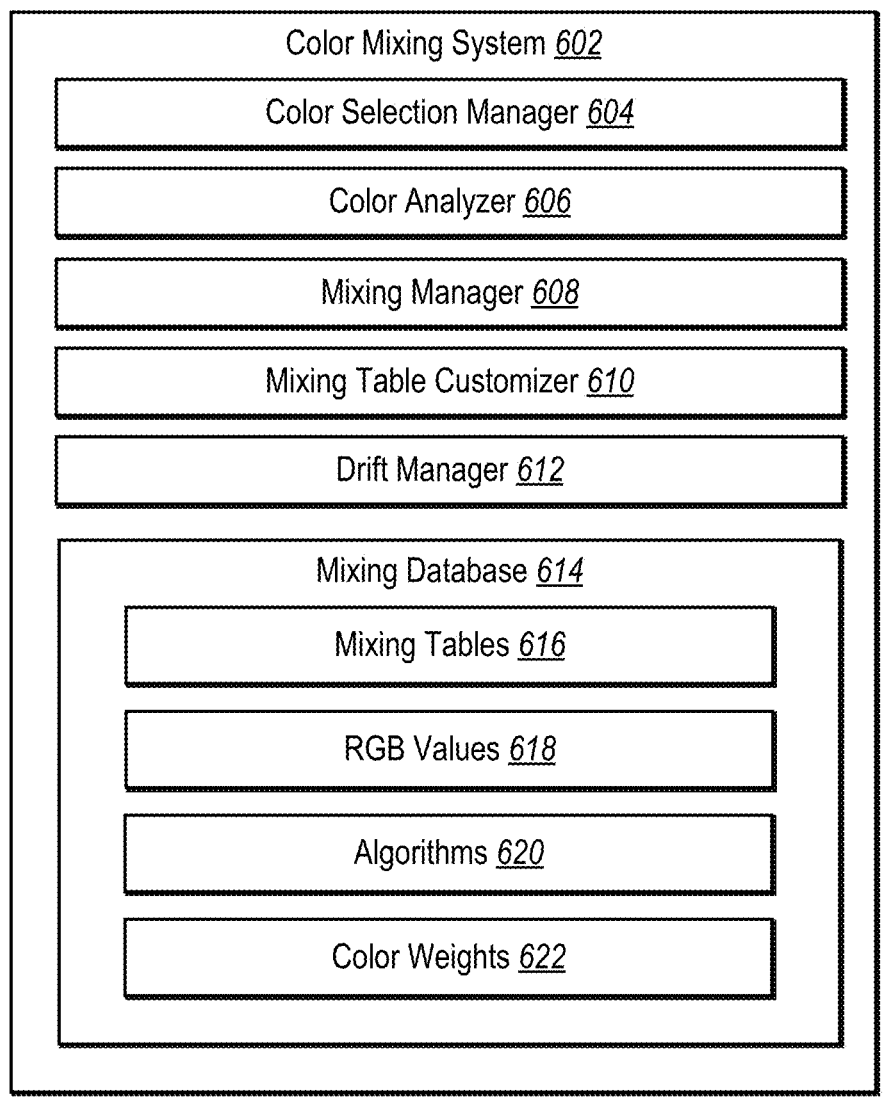
FIG. 6 shows a schematic representation of a color mixing system according to one or more embodiments of the present disclosure.

FIG. 6 illustrates a schematic diagram of a color mixing system 602 according to an embodiment of the present disclosure. The color mixing system 602 can be an example embodiment of the color mixing system described in connection with the color mixing system of FIGS. 1-5. The color mixing system 602 can include various components for performing the processes and features described herein. For example, an as illustrated in FIG. 6, the color mixing system 602 includes a color selection manager 604, a color analyzer 606, a mixing manager 608, a mixing table customizer 610, a drift manager 612, and a mixing database 614. In addition, the color mixing system 602 can include additional components not illustrated, such as those as described below. The various components of the color mixing system 602 may be in communication with each other using any suitable communication protocols.

As briefly mentioned above, the color mixing system 602 includes a color selection manager. The color selection manager 604 detects selections of two or more reference colors 106 to be mixed by the color mixing system. In particular, the color selection manager 604 detects a user interaction with the one or more of an image manipulation GUI and a mixing table GUI of an image manipulation system. Furthermore, the color selection manager 604 detects a user interaction to select the two or more reference colors 106 in any of the manners described above in regard to FIGS. 1 and 2.

Additionally, the color selection manager detects the weights or the selection of weights (e.g., mixing ratio) of the two or more reference colors 106 within the image manipulation GUI of the image manipulation system. In additional embodiments, the color selection manager sets (e.g., automatically set) the weights of the two reference colors 106 when a selection of the weights is not detected. For example, the color selection manager manages the selection of the weights of the two or more reference colors 106 in any manner described above in regard to FIGS. 1 and 2. Furthermore, the color selection manager stores data representing the weights (e.g., the mixing ratio) of the reference colors 106 within the mixing database 614 of the color mixing system 602.

As mentioned above, the color mixing system 602 includes a color analyzer 606. The color analyzer 606 determines whether a selected reference color 106 is a primary color or a non-primary color. Furthermore, the color analyzer 606 may communicate to the mixing manager 608 of the color mixing system 602 whether the selected reference color 106 is a primary color or a non-primary color. Additionally, the color analyzer 606 may determine the RGB values of the reference colors 106 and can communicate the RGB values to the mixing manager 608. Moreover, the color analyzer 606 can determine the weights of the eight primary colors of the RGB space within the reference color 106. For example, the color analyzer 606 can define the reference color 106 in terms of weights of each of the eight primary colors of the RGB space, as described above in regard to FIGS. 1 and 2. Upon determining the weights of the eight primary colors of the RGB space within the reference color 106, the color analyzer 606 saves data representing the weights of the eight primary colors of the reference color 106 within the mixing database 614.

As briefly mentioned above, the color mixing system 602 includes a mixing manager 608. The mixing manager 608 manages the selection and querying of mixing tables to determine mixed output colors 104. Additionally, for mixing ratios not matching mixing tables, the mixing manager 608 determines the closest mixing tables to the mixing ratios of the reference colors 106. Furthermore, the mixing manager 608 executes the algorithms (e.g., equations) described above in regard to FIGS. 1 and 2 to determine mixed output colors 104. For example, the mixing manager 608 can determine mixed output colors 104 in any of the methods described above in regard to FIGS. 1-5.

Additionally, as discussed above, the color mixing system 602 further includes a mixing table customizer 610. The mixing table customizer 610 manages the customization of mixing tables such as the mixing tables described above in regard to FIG. 3. For example, the mixing table customizer 610 detects user interactions with the image manipulation GUI of the image manipulation system and/or the mixing table GUI of the color mixing system 602 to customize a mixing table. For example, the mixing table customizer 610 can detect user interactions in any of the manners described above in regard to FIG. 3. Furthermore, upon customizing a mixing table, the mixing table customizer 610 stores data representing the customized mixing table within the mixing database 614.

Moreover, as mentioned above, the color mixing system 602 also includes a drift manager 612. The drift manager 612 prevents the mixed output colors 104 determined by the mixing manager 608 from changing (e.g., drifting) over time when repeatedly determining the same mixed output color 104. In particular, given the same non-primary reference colors 106 repeatedly, and limitations of matrix multiplication, the drift manager 612 prevents a mixed output color 104 from changing slightly over time. Furthermore, the drift manager 612 can modify the color mixing function described above in regard to FIGS. 1 and 2 to alleviate any drifting problems. For example, the drift manager 612 can prevent drifting of the mixed output color 104 in any of the manners described above in regard to FIGS. 1 and 2.

As mentioned above, the color mixing system 602 includes a mixing database 614. The mixing database 614 may include a single database or multiple databases. In addition, the mixing database 614 may be located within the color mixing system 602. Alternatively, the mixing database 614 may be external to the color mixing system 602, such as in cloud storage. Further, the mixing database 614 may store and provide data and information to the color mixing system 602, as further described below and as described above in regard to FIGS. 1 and 2.

As shown in FIG. 6, the mixing database 614 includes mixing tables 616, RGB values 618, algorithms 620 (e.g., equations), and color weights 622. For example, the mixing database 614 may include the mixing tables 616 utilized by the color mixing system 602 to determine mixed output colors 104. Each mixing table 616 can have a mixing table identifier number (or simply "mixing table ID number") to provide unique identification. In some cases, the mixing tables 616 may be organized according to mixing table ID number. Alternatively, mixing tables 616 in the mixing database 614 may be organized according to other criteria, such as creation date, last modified date, mixing ratios (e.g., weights of reference colors 106), etc.

As noted above, the mixing database 614 can include RGB values 618 of reference colors 106 and mixed output colors 104. For example, the mixing database 614 receives the RGB values 618 of reference colors 106 and the mixed output colors 104 of the mixing tables 616 from the color selection manager 604 and color analyzer 606. Additionally, the mixing database 614 can include the algorithms 620 utilized by the color mixing system 602 to determined mixed output colors 104. Moreover, the mixing database 614 can include the color weights 622 of reference colors 106 and the color weights 622 of mixed output colors 104 of the mixing tables 616.

Each of the components 604-614 of the color mixing system 602 (as shown in FIG. 6) may be in communication with one another using any suitable communication technologies. It will be recognized that although components 604-614 of the color mixing system 602 are shown to be separate in FIG. 6, any of components 604-614 may be combined into fewer components, such as into a single facility or module, divided into more components, or configured into different components as may serve a particular embodiment.

The components 604-614 of the color mixing system 602 can comprise software, hardware, or both. For example, the components 604-614 can comprise one or more instructions stored on a computer-readable storage medium and executable by processors of one or more computing devices. When executed by the one or more processors, the computer-executable instructions of the color mixing system 602 can cause a client device and/or a server device to perform the methods described herein. Alternatively, the components 604-614 and their corresponding elements can comprise hardware, such as a special purpose processing device to perform a certain function or group of functions. Additionally, the components 604-614 can comprise a combination of computer-executable instructions and hardware.

Furthermore, the components 604-614 may, for example, be implemented as part of one or more operating systems, as one or more stand-alone applications, as one or more modules of an application, as one or more plug-ins, as one or more library functions or functions that may be called by other applications, and/or as a cloud-computing model. Thus, the components 604-614 may be implemented as a stand-alone application, such as a desktop or mobile application. Furthermore, the components 604-614 may be implemented as one or more web-based applications hosted on a remote server. The components 604-614 may also be implemented in a suit of mobile device applications or "apps." To illustrate, the components 604-614 may be implemented in an application, including but not limited to ADOBE® PHOTOSHOP® software ADOBE® INDESIGN® or ADOBE® LIGHTROOM® software. "ADOBE," "PHOTOSHOP," "INDESIGN," and "LIGHTROOM" are either registered trademarks or trademarks of Adobe Systems Incorporated in the United States and/or other countries.

FIG. 6 illustrates a schematic diagram of one embodiment of an exemplary environment 600 in which the color mixing system 602 can operate. In one or more embodiments, the exemplary environment 600 includes one or more client devices 602a, 602b, ... 602n, a network 604, and server(s) 606. The network 604 may be any suitable network over which the computing devices can communicate. Example networks are discussed in more detail below with regard to FIG. 9.

As illustrated in FIG. 6, the environment 600 may include client devices 602a-602n. The client devices 602a-602n may comprise any computing device. For instance, in one or more embodiments, one or more of the client devices 602a-602n comprise one or more computing devices described below in relation to FIG. 9. A client application 610 can run on the client devices 602a-602n. The client application 610 can comprise an image manipulation system that allows a user to mix colors.

In addition, the environment 600 may also include the server(s) 606. The server(s) 606 may generate, store, receive, and transmit any type of data, including mixing tables 616, RGB values 618, algorithms 620, and color weights 622. For example, the server(s) 606 may transmit data to a client device, such as the client device 602a. The server(s) 606 can also transmit electronic messages between one or more users of the environment 600. In one example embodiment, the server(s) 606 comprise a content server. The server(s) 606 can also comprise a communication server or a web-hosting server. Additional details regarding the server(s) 606 will be discussed below with respect to FIG. 9.

As illustrated, in one or more embodiments, the server(s) 606 can include all, or a portion of, the color mixing system 602. In particular, the color mixing system 602 can comprise an application running on the server(s) 606 or a portion of a software application that can be downloaded from the server(s) 606. For example, the color mixing system 602 can include a web hosting application that allows the client devices 602a-602n to interact with content hosted at the server(s) 606. To illustrate, in one or more embodiments of the exemplary environment 600, one or more client devices 602a-602n can access a webpage supported by the server(s) 606. In particular, the client device 602a can run an application to allow a user to access, view, and/or interact with a webpage or website hosted at the server(s) 606.

In one or more embodiments, the server(s) 606 include an image manipulation system 611, including but not limited to ADOBE® PHOTOSHOP® software ADOBE® INDESIGN® or ADOBE® LIGHTROOM® software. The image manipulation system 611 can access or include the color mixing system 602.

Figure 7:
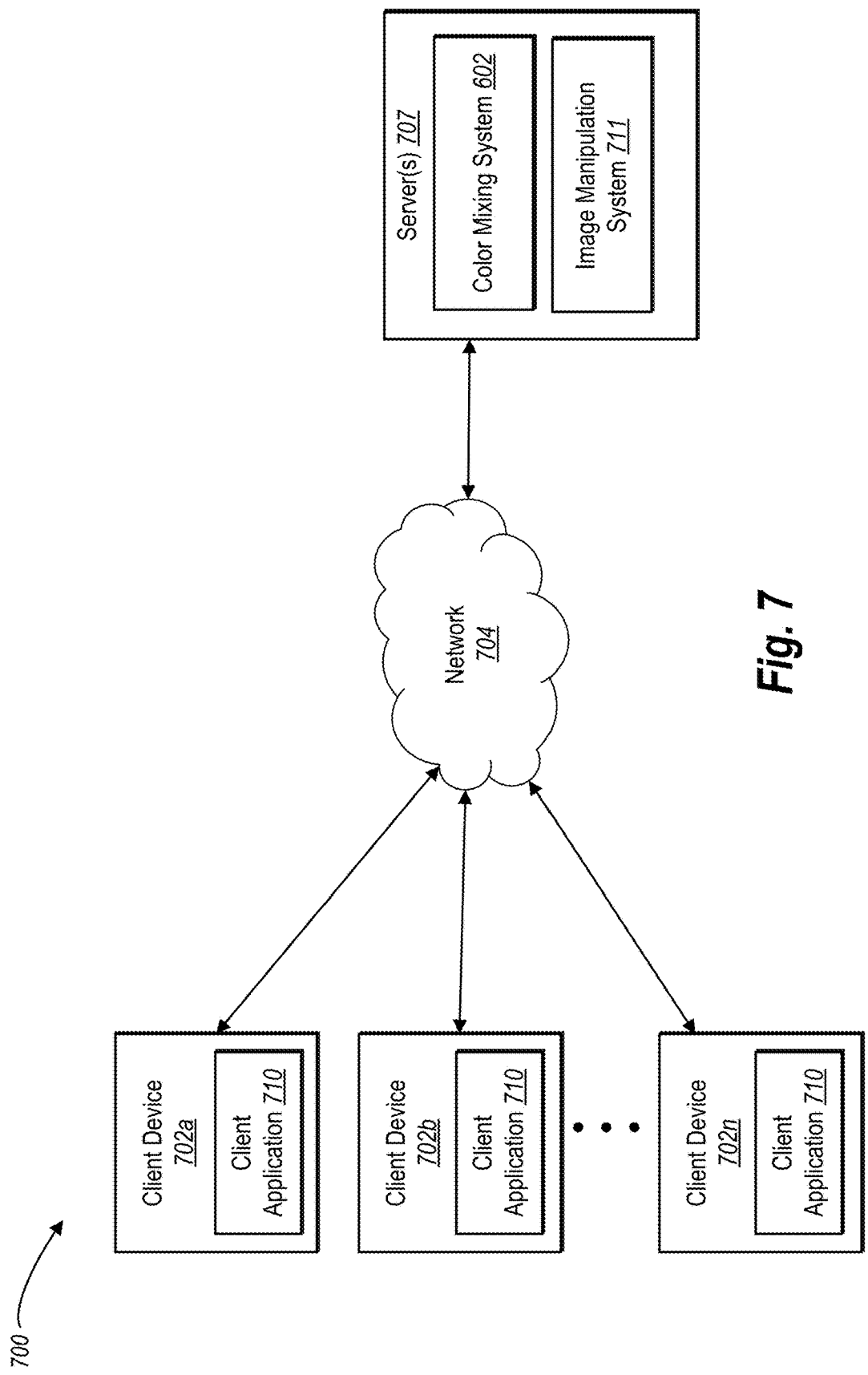
FIG. 7 illustrates an example environment in which the color mixing system of FIG. 6 may operate according to one or more embodiments of the present disclosure.

Although FIG. 7 illustrates a particular arrangement of the client devices 702a-702n, the network 704, and the server(s) 706, various additional arrangements are possible. For example, while FIG. 7 illustrates multiple separate client devices 702a-702n communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the color mixing system 602 can be implemented on a single computing device. In particular, the color mixing system 602 may be implemented in whole by the client device 702a or the color mixing system 602 may be implemented in whole by the server(s) 706. Alternatively, the color mixing system 602 may be implemented across multiple devices or components (e.g., utilizing the client devices 702a-702n and the server(s) 706).

By way of example, in one or more embodiments, the client device 702a can send a request to the server(s) 706 to obtain a mixed output color based on two or more reference colors. The server(s) 706 can provide access to one or mixing tables to the client device 702a. The server(s) 706 can also provide digital images to the client device 702a. For example, in one or more embodiments, a user of client device 702b can generate a custom mixing table 300 and transmit the custom mixing table 300 to the color mixing system 602 at server(s) 706. A user of the client device 702a can then request the custom mixing table 300 from the server(s) 706. In response to the request, the server(s) 706 can send the custom mixing table 300 to the client device 702a.

Figure 8:
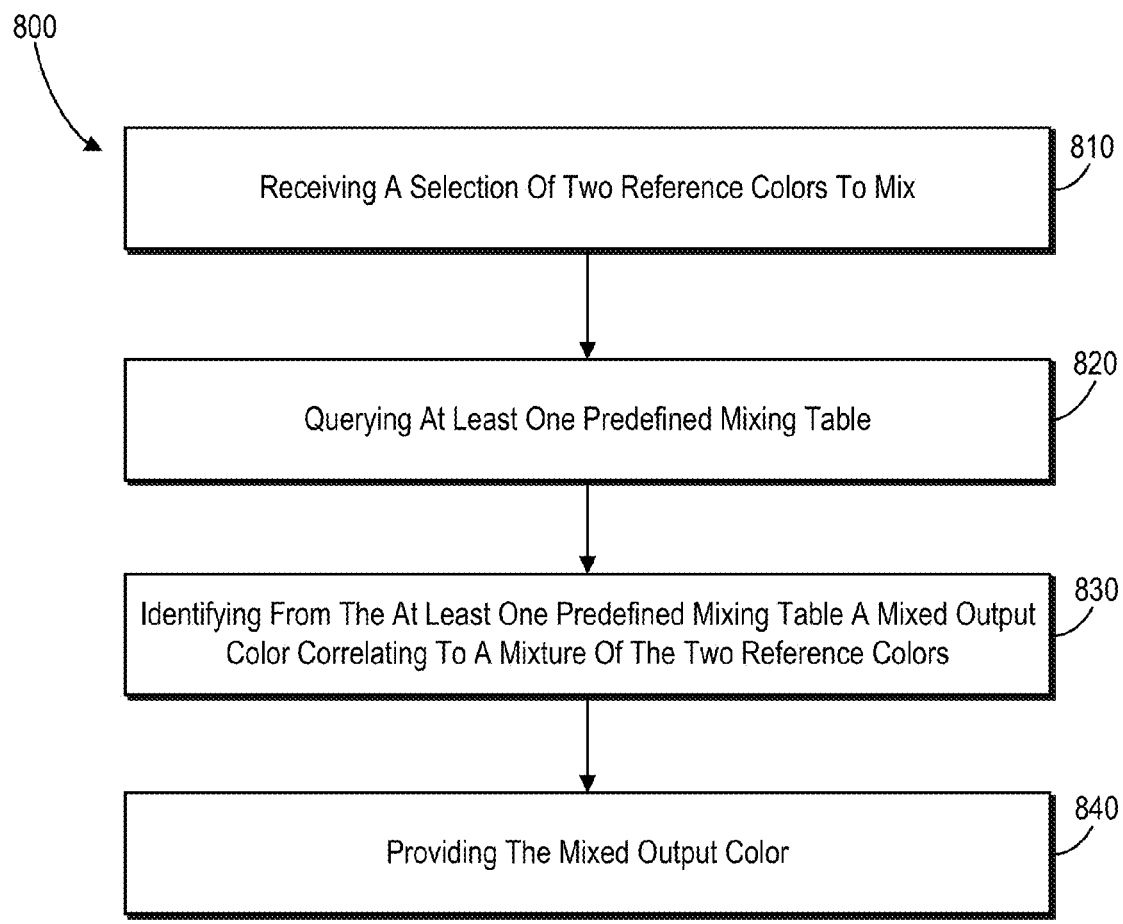
FIG. 8 shows a flowchart of an example method for providing a digital mixed output color that at least generally reflects a real world mixed color for two reference colors.

FIG. 8 illustrates a flowchart of an example method 800 for providing a digital mixed output color 104 from two reference colors 106. The method 800 can be implemented by the color mixing system described above. The method 800 involves an act 810 of receiving a selection of two reference colors 106 to mix. For example, as mentioned above, the color mixing system can receive a selection of a first reference color 106a and a second reference color 106b. In one or more embodiments, receiving a selection of two reference colors 106 to mix can include detecting a user interaction selecting (e.g., indicating) a first reference color 106a and a separate user interaction selecting a second reference color 106b. Additionally, receiving a selection of two reference colors 106 to mix can include receiving an indication of a designated weight for each of the reference colors 106 of the two reference colors 106. Moreover, receiving a selection of two reference colors 106 to mix may include any of the actions discussed above in regard to FIGS. 1-4.

Additionally, the method 800 involves an act 820 of querying at least one predefined mixing table 100. For example, querying at least one predefined mixing table 100 can include at least three predefined mixing tables 100. Furthermore, querying at least three predefined mixing tables 100 can include querying a first mixing table 100 to determine a blue value of the mixed output color 104, querying a second mixing table 100 to determine a red value of the mixed output color 104, and querying a third mixing table 100 to determine a green value of the mixed output color 104. Additionally, querying at least one predefined mixing table 100 can include querying at least one 8 by 8 mixing table 100. Moreover, querying at least one predefined mixing table 100 can include any of the actions discussed above in regard to FIGS. 1-4.

Furthermore, the method 800 involves an act 830 of identifying from the at least one predefined mixing table 100 a mixed output color 104 correlating to a mixture of the two reference colors 106. In particular, the act 830 may include identifying a mixed output color 104 having a first red value, a first green value, and a first blue value that are different from a second red value, a second green value, and a second blue value determined by combining the red value, the green value, and blue value of the two reference colors 106 to mix. Additionally, identifying from the at least one predefined mixing table 100 a mixed output color 104 correlating to a mixture of the two reference colors 106 can include any of the actions described above in regard to FIGS. 1-4.

The method 800 also involves an act 840 of providing the mixed output color 104. For example, the act 840 can include providing the mixed output color 104 within an instrument of an image manipulation system. In particular, the act 840 can include providing the mixed output color 104 within an instrument (e.g., virtual pencil, virtual paintbrush, virtual marker, etc.) of the of the image manipulation GUI of the image manipulation system. Additionally, the act 840 may include any of the actions described above in regard to providing the mixed output color 104 in reference to FIGS. 1-5.

In addition to the steps illustrated, method 800 can also include detecting at least one user interaction to at least partially define the predefined mixing table 100. Moreover, method 800 can also include defining each color of the two reference colors 106 as weights of eight predefined primary colors of an RGB space. Furthermore, method 800 can include detecting a selection of a third reference color 106 to mix with the mixed output color 104 from the user, querying at least one additional predefined mixing table 100, identifying from the at least one additional predefined mixing table 100 an additional mixed output color 104 representing a mixture of the mixed output color 104 and the third reference color 106, and providing the additional mixed output color 104. In yet further embodiment, method 800 can include defining the first reference color 106a as weights of eight predefined primary colors of an RGB space and defining the second reference color 106b as weights of the eight predefined primary colors of the RGB space.

Figure 9:
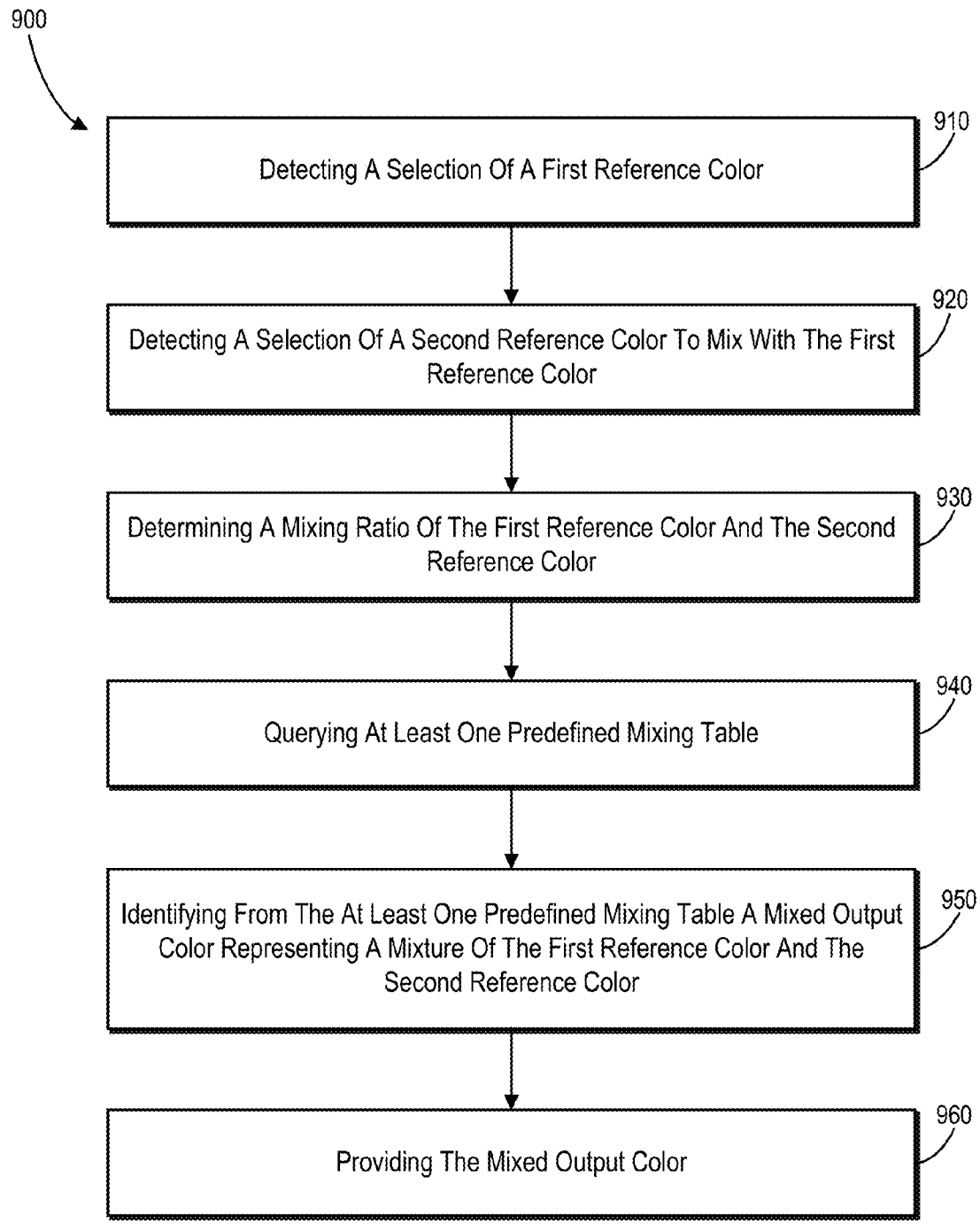
FIG. 9 shows a flowchart of another example method for providing a digital mixed output color that at least generally reflects a real world mixed color for two reference colors.

FIG. 9 illustrates a flowchart of another example method 900 for providing a digital mixed output color 104 that at least generally reflects a real world mixed color for two reference colors 106. The method 900 can be implemented by the color mixing system described above. The method 900 involves an act 910 of detecting a selection of two reference colors 106 to mix and an act 920 of detecting a selection of a second reference color 106b to mix with the first reference color 106a. For example, detecting a selection of two reference colors 106 to mix can include detecting a user interaction selecting (e.g., indicating) a first reference color 106a and a separate user interaction selecting a second reference color 106b. Moreover, detecting a selection of two reference colors 106 to mix may include any of the actions discussed above in regard to FIGS. 1-4.

Additionally, the method 900 involves an act 930 of determining a mixing ratio of the first reference color 106a and the second reference color 106b. For example, determining a mixing ratio of the first reference color 106a and the second reference color 106b can include receiving a selection of a designated weight of the first reference color 106a and receiving a selection of a designated weight of the second reference color 106b. Furthermore, determining a mixing ratio of the first reference color 106a and the second reference color 106b can include any of the actions discussed above in regard to FIGS. 1-4.

Furthermore, the method 900 involves an act 940 of querying at least one predefined mixing table 100. For example, querying at least one predefined mixing table 100 can include at least three predefined mixing tables 100. Furthermore, querying at least three predefined mixing tables 100 can include querying a first mixing table 100 to determine a blue value of the mixed output color 104, querying a second mixing table 100 to determine a red value of the mixed output color 104, and querying a third mixing table 100 to determine a green value of the mixed output color 104. Additionally, querying at least one predefined mixing table 100 can include querying at least one 8 by 8 mixing table 100. Moreover, querying at least one predefined mixing table 100 can include any of the actions discussed above in regard to FIGS. 1-4.

Furthermore, the method 900 involves an act 950 of identifying from the at least one predefined mixing table 100 a mixed output color 104 representing a mixture of the first reference color 106a and the second reference color 106b. In particular, the act 950 may include identifying a mixed output color 104 having a first red value, a first green value, and a first blue value that are different from a second red value, a second green value, and a second blue value determined by combining the red value, the green value, and blue value of the two reference colors 106 to mix. Additionally, identifying from the at least one predefined mixing table 100 a mixed output color 104 representing a mixture of the first reference color 106a and the second reference color 106b can include any of the actions described above in regard to FIGS. 1-4.

The method 900 also involves an act 960 of providing the mixed output color 104. For example, the act 960 can include providing the mixed output color 104 within an instrument of an image manipulation system. In particular, the act 960 can include providing the mixed output color 104 within an instrument (e.g., virtual pencil, virtual paintbrush, virtual marker, etc.) of the of the image manipulation GUI of the image manipulation system. Additionally, the act 960 may include any of the actions described above in regard to providing the mixed output color 104 in reference to FIGS. 1-4.

In addition to the steps illustrated, method 900 can also include detecting at least one user interaction to at least partially define the predefined mixing table 100. Moreover, method 900 can also include defining each color of the two reference colors 106 as weights of eight predefined primary colors of an RGB space. Furthermore, method 900 can include detecting a selection of a third reference color 106 to mix with the mixed output color 104 from the user, querying at least one additional predefined mixing table 100, identifying from the at least one additional predefined mixing table 100 an additional mixed output color 104 representing a mixture of the mixed output color 104 and the third reference color 106, and providing the additional mixed output color 104. In yet further embodiments, method 900 can include defining the first reference color 106a as weights of eight predefined primary colors of an RGB space and defining the second reference color 106b as weights of the eight predefined primary colors of the RGB space.

The method can further involve an act of defining the first reference RGB color as a first 1 by 8 vector including weights of eight predefined primary colors of an RGB space. Similarly, the method can involve the act of defining the second reference RGB color as a second 1 by 8 vector including weights of the eight predefined primary colors of the RGB space. More particularly, the method can involve performing trilinear interpolation of the first reference RGB color into a three-dimensional cube with the eight predefined primary colors of the RGB space as vertices of the three-dimensional cube. Similarly, the method can involve performing trilinear interpolation of the second reference RGB color into the three-dimensional cube with the eight predefined primary colors of the RGB space as vertices of the three-dimensional cube. In such embodiments, the act 940 of querying at least one predefined mixing table 100 can involve querying a first 8 by 8 matrix including red values, a second 8 by 8 matrix including green values, and a third 8 by 8 matrix of blue values. Furthermore, the act 950 of identifying from the at least one predefined mixing table the mixed output RGB color representing the mixture of the first reference RGB color and the second reference RGB color can involve (1) transposing the first 1 by 8 vector and multiplying the transposed first 1×8 vector by the first 8×8 matrix and the second 1×8 vector to identify a red value of the mixed output RGB color; (2) multiplying the transposed first 1×8 vector by the second 8×8 matrix and the second 1×8 vector to identify a green value of the mixed output RGB color; and (3) multiplying the transposed first 1×8 vector by the third 8×8 matrix and the second 1×8 vector to identify a blue value of the mixed output RGB color.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
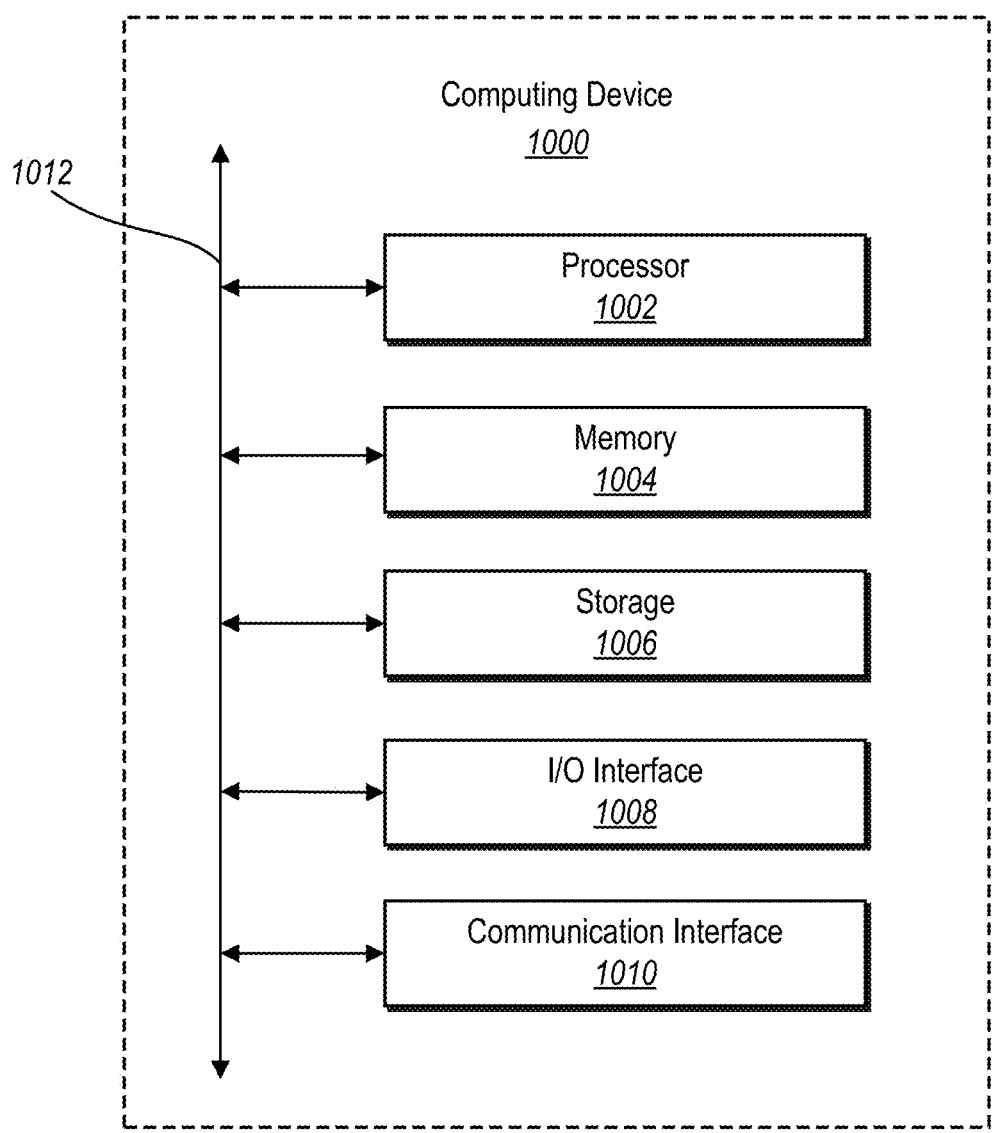
FIG. 10 illustrates a block diagram of an example computing device in accordance with one or more embodiments.

FIG. 10 illustrates, in block diagram form, an exemplary computing device 1000 that may be configured to perform one or more of the processes described above. One will appreciate that the color mixing system 502 can be implemented by a computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for manipulating digital images, a computer-implemented method of mixing digital colors, comprising:
   receiving a selection of a first reference RGB color and a second reference RGB color for mixing;
   accessing at least one predefined mixing table;
   a step for identifying, without converting the first reference RGB color or the second reference RGB color to another color model and without combining RGB values of the first reference RGB color and the second reference RGB color, from the at least one predefined mixing table, a mixed output RGB color correlating to a mixture of physical pigments corresponding to the first reference RGB color and the second reference RGB color; and
   providing the mixed output RGB color.

2. The method of claim 1, wherein receiving the selection of the first reference RGB color and the second reference RGB color for mixing comprises receiving an indication of a designated weight for each of the first reference RGB color and the second reference RGB color.

3. The method of claim 1, wherein accessing the at least one predefined mixing table comprises accessing at least three predefined mixing tables.

4. The method of claim 3, wherein accessing the at least three predefined mixing tables comprises:
   accessing a first mixing table to determine a blue value of the mixed output RGB color;
   accessing a second mixing table to determine a red value of the mixed output RGB color; and
   accessing a third mixing table to determine a green value of the mixed output RGB color.

5. The method of claim 4, further comprising representing the first reference RGB color as a first set of weights of eight predefined primary colors of an RGB space and the second reference RGB color as a second set of weights of the eight predefined primary colors of the RGB space.

6. The method of claim 5, wherein the step for identifying from the at least one predefined mixing table the mixed output RGB color correlating to the mixture of the physical pigments corresponding to the first reference RGB color and the second reference RGB color comprises multiplying the first set of weights and the second set of weights of the eight predefined primary colors and the first, second, and third mixing tables.

7. The method of claim 1, wherein the mixed output RGB color comprises a first red value, a first green value, and a first blue value that are different from a second red value, a second green value, and a second blue value, wherein the second red value, the second green value, and the second blue value are determined by combining a red value, a green value, and a blue value of the first reference RGB color and the second reference RGB color.

8. In a digital medium environment for manipulating digital images, a computer-implemented method of mixing digital colors, comprising:
  detecting a selection of a first reference RGB color;
  detecting a selection of a second reference RGB color to mix with the first reference RGB color;
  determining a mixing ratio of the first reference RGB color and the second reference RGB color;
  accessing at least one predefined mixing table based on the mixing ratio;
  identifying from the at least one predefined mixing table a mixed output RGB color representing a mixture of physical pigments corresponding to the first reference RGB color and the second reference RGB color without converting the first reference RGB color or the second reference RGB color to another color model and without combining RGB values of the first reference RGB color and the second reference RGB color; and
  providing the mixed output RGB color.

9. The method of claim 8, further comprising:
  detecting a selection of a third reference RGB color to mix with the mixed output RGB color;
  accessing at least one additional predefined mixing table;
  identifying from the at least one additional predefined mixing table an additional mixed output RGB color representing a mixture of physical pigments corresponding to the mixed output RGB color and the third reference RGB color; and
  providing the additional mixed output RGB color.

10. The method of claim 8, wherein determining the mixing ratio of the first reference RGB color and the second reference RGB color comprises:
  receiving a selection of a first designated weight of the first reference RGB color; and
  receiving a selection of a second designated weight of the second reference RGB color.

11. The method of claim 8, further comprising:
  defining the first reference RGB color as a first vector including weights of eight predefined primary colors of an RGB space; and
  defining the second reference RGB color as a second vector including weights of the eight predefined primary colors of the RGB space.

12. The method of claim 11, wherein defining the first reference RGB color as weights of the eight predefined primary colors of the RGB space comprises performing trilinear interpolation of the first reference RGB color into a three-dimensional cube with the eight predefined primary colors of the RGB space as vertices of the three-dimensional cube.

13. The method of claim 12, wherein accessing the at least one predefined mixing table based on the mixing ratio comprises accessing a first matrix including red values, a second matrix including green values, and a third matrix of blue values.

14. The method of claim 13, wherein identifying from the at least one predefined mixing table the mixed output RGB color representing the mixture of the physical pigments corresponding to the first reference RGB color and the second reference RGB color comprises:
  transposing the first vector and multiplying the transposed first vector by the first matrix and the second vector to identify a red value of the mixed output RGB color;
  multiplying the transposed first vector by the second matrix and the second vector to identify a green value of the mixed output RGB color; and
  multiplying the transposed first vector by the third matrix and the second vector to identify a blue value of the mixed output RGB color.

15. The method of claim 14, further comprising maintaining each of the red, green, and blue values of the mixed output RGB color between a pair of respective boundary values to avoid drift.

16. The method of claim 8, wherein the at least one predefined mixing table comprises a matrix indicating a mixed output RGB color for each pair of eight primary reference colors.

17. The method of claim 16, further comprising customizing the at least one predefined mixing table by modifying one or more of the mixed output RGB colors based on user reference.

18. A system for mixing digital colors comprising:
  a memory comprising a mixing table indicating a mixed output RGB color for each pair of colors derived from eight primary RGB colors; and
  a computing device comprising instructions thereon that, when executed by at least one processor, cause the system to:
    define a first reference RGB color as a first set of weights of the eight primary RGB colors;
    define a second reference RGB color as a second set of weights of the eight primary RGB colors;
    determine an output RGB color corresponding to a mixture of physical pigments corresponding to the first and second reference RGB colors, without converting the first and second reference RGB colors to another color model and without combining RGB values of the first and second reference RGB colors, based on the mixing table and the first and second sets of weights of the eight primary RGB colors; and
  modify a digital image using the output RGB color.

19. The system of claim 18, wherein:
  the mixing table comprises a first matrix of red values, a second matrix of green values, a third matrix of blue values; and
  the system determines the output RGB color by multiplying the each of the first, second, and third matrices by the first and second sets of weights of the eight primary RGB colors.

20. The system of claim 18, wherein the system determines the output RGB color by interpolating based on a first predefined mixing table and a second predefined mixing table.

* * * * *